United States Patent Office 3,334,058
Patented Aug. 1, 1967

3,334,058
PROCESS OF DISPERSING ASPHALTENES IN RUBBER
Robert M. Alm, Crown Point, Ind., assignor to Standard Oil Company, Chicago, Ill., a corporation of Indiana
No Drawing. Filed Jan. 7, 1964, Ser. No. 336,128
2 Claims. (Cl. 260—28.5)

This application is a continuation-in-part of my application Ser. No. 175,352, filed Feb. 23, 1962, now abandoned.

This invention relates to rubber compositions both in the vulcanized and unvulcanized state and more particularly pertains to a method for reinforcing vulcanizates of rubbery elastomeric materials, both natural and synthetic rubber, with asphaltenes as well as the method for incorporating asphaltenes into rubbery elastomeric materials prior to vulcanization and to the resulting compositions.

Finely divided carbon blacks have been widely used in the preparation of vulcanized rubber compositions. To a somewhat lesser extent, extremely fine particles of silica have also been used and for some cases have been suggested as reinforcing and abrasion-resistant agents for a certain type of light-colored rubber articles. Clays, hard asphalts, calcium carbonate, and the like have been long used as inexpensive fillers. Some of the carbon blacks are incorporated into rubber compositions to impart to the resulting vulcanizates high abrasion resistance. Other carbon blacks are incorporated as reinforcing agents, i.e. to increase the tensile strength of the resulting vulcanizate. Still other carbon blacks are employed to facilitate the processing, such as extruding, of vulcanizable rubber compositions. In general, reinforcing agents, fillers, processing aids, etc., are incorporated and dispersed in the solid rubber by mechanical mixing as in a Banbury mill mixer or on a two-roll compounding mill. Large amounts of power are required for such mixing steps for incorporating finely divided solid materials into the elastic solid rubbery materials. One method for overcoming at least a portion of the high-power requirements for compounding vulcanizable rubber compositions has been developed and commercially employed is known as master batching. In one type of master batching larger proportions of carbon black to rubber, 100 to 200 parts of more of carbon black per 100 parts of rubber on a weight basis, are incorporated by mill mixing. The high carbon black content rubber is added to additional rubber in the final mixing to incorporate vulcanizing agents, accelerators, antioxidants, softeners, etc., so that the resulting vulcanizable composition contains the desired amount of carbon black in the range of about 26 parts per 100 parts of rubber. Another technique used especially for incorporating carbon black in synthetic rubbery polymers involves adding the carbon black to rubber latices and then precipitating the rubber-carbon black mixture, as for example, by coagulation. When such a premixing is carried out, greater quantities of the carbon black based on the solid rubber are incorporated and the resulting mixture known in the trade as a carbon black master batch is then incorporated into additional quantities of rubber to provide the desired carbon black concentration. This master batch preparation technique not only results in the reduction of power requirement but also results in the saving of ultimate mixing time, the reduction of mixing equipment and the reduction of inventory storage space. Also, since the finely divided carbon black can be added to the latices in a closed system, there can be eliminated the otherwise ever present far reaching dusting by carbon black.

My invention relates to the utilization of asphaltenes, derivable from residual petroleum products, in place of conventional blacks and in part is based on the discovery that appropriately incorporated asphaltenes impart surprising reinforcing strength to vulcanized rubber products.

Although the study of asphalts to determine the nature of the components thereof has been rather extensive and continuous over the past 46 years, the precise chemical nature of the asphaltenes components of asphalts have not been precisely characterized. A hard component of asphalts is precipitated therefrom by the use of various solvents such as light petroleum naphtha, hexane, n-pentane and 1-butane, among others, added to asphalts. The hard precipitate has become known as asphaltene. The asphalt components dissolved in said solvents have been fractionated into resinous materials and oils and the oils have been further resolved into saturated and unsaturated components. For the purposes of this invention the term "asphaltenes" is employed to identify the hard component of asphalt precipitated by treating asphalt with the foregoing solvents, especially n-pentane. Even the n-pentane insoluble asphalt component may contain some of the resins and oils originally present in the asphalt. It is desirable for the purposes of this invention to use asphaltenes containing not more than a total of about 15 to 17% resins and oils, as for example, determined by extraction of the n-pentane insoluble asphalt component with ether. Preferably, the asphaltenes contain a total of 10% or less of the resins and oils, i.e. have an asphaltene content of 90% and above. Asphalts depending on their source and penetration identification contain varying amounts of asphaltenes (n-pentane insolubles). For example, 100 ASTM penetration asphalts contain from about 13 to 29% n-pentane insoluble asphaltenes with from about 22 to 29% resins and 44 to 50% oils. Generally, the resins content decreases as the asphaltenes content increases. Asphaltenes contain metals including vanadium, iron and nickel probably as organo-metallic compounds of apparent high thermal stability. A more complete discussion of asphaltenes content of asphalts and the problems of asphalt analysis are presented in "Asphalt—Its Composition, Properties and Uses," by Ralph N. Traxler (1961), Reinhold Publishing Corporation, New York, especially in chapter 2, pages 7 to 31.

Many attempts have been made to utilize the hard asphaltic materials containing substantial amounts of asphaltenes in the preparation of rubber compounds especially as fillers for rubber vulcanizates. Such asphaltenes-containing materials are known as hard hydrocarbon or mineral rubber. Such materials may contain up to about 50% asphaltenes in combination with resins and oils. They are mainly used as low-cost fillers but have no demonstrated any reinforcing effect on the rubber vulcanizates. Other asphaltene-containing materials that have been added to unvulcanized rubber compositions are the gilsonites that contain at the maximum about 65% asphaltenes. In Industrial and Engineering Chemistry, 41, 598 (1949), Fritz Rostler et al. report the preparation of rubber formulations containing various fractions of petroleum. Also included were rubber formulations containing materials having an asphaltenes content such as gilsonites and mineral rubbers. In all formulations but one, only minor proportions of asphaltenes-containing materials in combination with large quantities of channel black were employed. In one rubber formulation the authors employed 40 parts per hundred of gilsonite having an asphaltene content of 48%. All of these rubber formulations were prepared by conventional roll mill mixing.

It has been observed that conventional roll mill mixing of asphaltenes with vulcanizable rubbery elastomeric materials does not impart to the resulting vulcanizate any reinforcement of the vulcanizate, but rather substantially reduces the ultimate tensile strength which result is entirely opposite to reinforcement. One reason perhaps for lack of reinforcing by asphaltenes is perhaps that the asphaltenes are so hard that they are not reduced by roll mill mixing to a particle size sufficiently small to have any beneficial reinforcing characteristics or the proper dispersion of asphaltene of the required particle size in rubber is not achieved. There are certain properties of the asphaltenes which have appeared during my course of investigating asphaltenes as indicating that asphaltenes should have reinforcing properties for rubbery elastomeric materials, both natural and synthetic rubbers, and especially their vulcanizates. Also during this course of investigation of the properties of asphaltenes with respect to the use thereof in rubber compositions, it became apparent that a method other than mill mixing (roll mill or Banbury) was needed for incorporating asphaltenes into vulcanizable rubbery elastomeric materials so that the potential reinforcing effect of asphaltenes could be obtained.

A technique for obtaining the potential reinforcing effects of asphaltenes in natural and synthetic vulcanizable rubbers has been discovered. This technique is the dispersing of asphaltenes in natural or synthetic rubbers so that the asphaltenes as dispersed in the solid natural or synthetic rubber has a particle size of a diameter not exceeding 5 microns. Preferably the asphaltenes in rubber dispersion should be such that the dispersed asphaltenes particle has a diameter in the range of 0.01 to 1.0 micron. Not all of the particles of asphaltenes have to be of identical size for they can vary over the range of 0.01 to 5 microns in diameter with a minor amount as large as 50 to 100 microns. For the purposes of this invention a range of size distribution of the particles of asphaltenes dispersed in rubber is preferred so that the largest asphaltenes do not exceed about 10 microns in diameter and have a size average in the range of 0.01 to 1.0 micron diameter.

With respect to the dispersion of particles of asphaltenes in solid rubber, natural or synthetic, where the particle size of asphaltenes in solid rubber is critical for the obtainment of reinforcing, the physical state is analogous to a solid solution wherein the particles of asphaltenes is the solute and the solid natural or synthetic rubber is the solvent. In any case the solid natural or synthetic rubber is the continuous phase containing the dispersed solid particles of asphaltenes of the critical diameter, not exceeding 5 microns, as hereinbefore described. It is appreciated that micellar particles of asphaltenes (asphaltenes plus adsorbed and immobilized resins and perhaps some solvent) have been determined and in general the micellar particle size appears to be in the range of dispersed size particles of asphaltenes in rubbers. This micellar particle size is analogous to molecular size for pure compounds. However, even though the micellar particle size (measured using solutions of asphaltenes) is in the aforementioned critical size of particles of asphaltenes dispersed in rubbers, simple solvent mixing, i.e. mixing a solution of asphaltenes with solid rubbers or with solutions of rubber, will not result in the formation of the dispersions of particles of asphaltenes of the critical dispersed diameter in the continuous rubber phase. It is, of course, essential that the dispersed particles of asphaltene be substantially uniform throughout the continuous solid rubber phase.

In solution or dispersion the particles of asphaltene may, as micellar particles, have the diameter range hereinbefore set forth for the particles of asphaltenes dispersed uniformly in rubber. However, unless the particles in the solid continuous rubber phase have the critical diameter hereinbefore set forth, the outstanding reinforcement will not be obtained. Merely adding a solution of asphaltene to rubber on roll mills or in a Banbury mill will not provide critical diameter particles of asphaltene uniformly dispersed in rubber to obtain the reinforcing potential. Mixing of these types (2 roll mill or Banbury) permit large agglomerates of asphaltenes to form from the much smaller micellar particles. These larger agglomerates do not break down even on a two roll mill to give a uniform dispersion of the critical diameter particles of asphaltenes.

One method for accomplishing the technique of obtaining a reinforcing asphaltene dispersion comprises first combining a liquid, e.g. a solution, gel or colloidal suspension containing vulcanizable natural and synthetic rubber, with a solution or colloidal suspension of asphaltene in the same liquid or in a liquid compatible with the solvent or suspending liquid employed to form said suspension, gel or solution of the vulcanizable rubbery elastomeric material. Second it is necessary to form a substantially uniform homogeneous intimate dispersion of particles asphaltenes in the rubber in the resulting mixture wherein the particle of asphaltenes have the critical size hereinbefore stated. Thereafter, the liquid or liquids employed in the formation of the gel, suspension or solutions are removed. The resulting solid, a dispersion of particles asphaltene in vulcanizable natural or synthetic rubber material, is combined with vulcanizing agents such as sulfur or selenium, among others, vulcanization accelerators, vulcanization activators, anti-oxidants, extrusion aids, extenders, softeners, pigments, and other compounding ingredients commonly employed in the preparation of compositions suitable for forming into vulcanized articles of manufacture. By the above method for forming a substantially uniform dispersion of critical size particles asphaltenes in vulcanizable natural and synthetic rubber there can be incorporated from 10 to 100 parts of asphaltenes by weight for each 100 parts of vulcanizable rubber by weight. When asphaltenes in rubber dispersions are prepared having the foregoing weight ratios, the dispersed particles of asphaltenes replace as a reinforcing agent a greater volume of reinforcing black than a weight part for weight part might indicate. Thus, where 50 weight parts of HAF black per 100 weight parts rubber are required for optimum reinforcement, the use of 25 weight parts asphaltenes per 100 parts rubber by weight replaces more than 25 weight parts of HAF black.

The choice of liquids to form the suspension or solution of asphaltenes to be combined with the solution, suspension or gel of vulcanizable rubbery elastomeric material varies greatly. The only limitation is that the liquid used to form the solution or suspension of asphaltenes be compatible with the liquid employed to form the solution, gel or suspension of said rubbery material. This limitation is only applicable when all of both liquid compositions are combined, for in this case, it is apparent that the liquid used with said rubbery material should not be an anti-solvent for the dissolved asphaltenes or an anti-dispersant for the suspended asphaltene and, thus, upon mixing of the two liquid media cause precipitation of asphaltene or said rubbery material before a substantially uniform dispersion of particles of asphaltenes of critical diameter in said rubbery material can be formed. However, when two liquid compositions, one containing the rubber and the other containing the asphaltenes are continuously combined as individual feed streams to a homogenizing mill or other similar high shear mixing device, the liquid media for the two compositions need not be compatible.

Although the asphaltene reinforcing technique of this invention is useful for incorporating asphaltenes in solid synthetic rubber materials such as copolymers of butadiene-1,3, especially copolymers with styrene, natural rubbers, copolymers of diolefins with mono-olefins such as butyl, rubbers, stereo-specific homopolymers of butadiene-1,3:cis-polybutadiene or isoprene:cis-polyisoprene, the technique of this invention is most advantageously employed to form substantially uniform dispersions of critical diameter particles of asphaltenes in cis-polybutadiene or cis-polyisoprene. This is so because these man-made or synthetic rubber polymers are made by the catalytic polymerization of butadiene-1,3 or isoprene in hydrocarbon solvents which are also solvents for asphaltenes or are compatible with solutions of asphaltenes. Specific solvents used in the polymerizations are butane, pentane, hexane, heptane, octane, cetane, cyclohexane, benzene, toluene, xylene, o-dichlorobenzene and 1-chloropentane as well as hydrocarbon mixtures.

The technique of this invention is also advantageously employed with tough or high Mooney plasticity, e.g. Mooney plasticity values of at least 90 desirably above 100 and up to computed Mooney values as high as 225 and above, synthetic rubbers that are polymers of conjugated diolefinic compounds such as butadiene-1,3, isoprene, dimethylbutadiene and others having not more than and preferably less than eight carbon atoms. By polymers of said conjugated diolefins is meant homopolymers of the conjugated diolefinic compounds as well as copolymers of one or more of the conjugated diolefinic compounds with one or more copolymerizable mono-olefins including arylolefins such as styrene, α-methyl-styrene, 3,4-dichloro-α-methyl styrene, p-acetyl-α-methyl-styrene, 2,5- and 3,5-dichlorostyrene, 3,4-dimethylstyrene, 3-chloro-4-methylstyrene as well as unsaturated ketones of which methylisopropenylketone and methylvinylketone are examples.

In said copolymers the conjugated diene or dienes usually are at least 50% by weight of the copolymer. However copolymers containing up to 85% styrene and 15% or more butadiene or total conjugated diene are also useful for this invention.

In addition to the aforementioned solvents for asphaltenes there are especially useful with the especially tough or high Mooney plasticity value synthetic rubbers, hydrocarbon oils and synthetic oils as are compatible with these synthetic rubbers and function as plasticizers therefor. Solutions of solid or semi-solid rubber plasticizers in these oils are also useful solvents for asphaltenes and use of them can be made in the dispensing technique of this invention to obtain the reinforcing effect to asphaltenes. Desirably liquid natural or synthetic oils and/or plasticizers of low pour point are used. Mineral oils boiling above 450° F. and preferably above 550 to 600° F. are ordinarily the plasticizers of choice with those of substantial aromatic content being preferred plasticizers for copolymers containing appreciable aromatic nucleus, e.g. from styrene, substituted styrenes and the like copolymerizable monomers. Such mineral oils and plasticizers include but are not limited to those characterized as follows:

Sundex 53 (a product of Sun Oil Company)

A dark aromatic and naphthenic blending lubricating oil extract consisting of 76% aromatic hydrocarbons and 26% naphthenic hydrocarbons having a Saybolt viscosity of 90 seconds at 210° F., a specific gravity of 0.97, a pour point of 70° F., a flash point of 380° F., an aniline point of 130° F. and some hydrocarbons have aliphatic unsaturation.

Dutrex 6 (a product of Shell Development)

A complex petroleum mixture boiling above 600° F. having high molecular weight aromatic and unsaturated hydrocarbons with no volatile or asphaltic residue and having a Saybolt viscosity of 142 seconds at 210° F. and a specific gravity of 1.02.

Dutrex 7 (a product of Shell Development)

A petroleum derived plasticizer of heavy process oil type having a flash point of 410° F., a specific gravity of 1.0 and a Saybolt viscosity of 142 seconds at 210° F.

Circosol 2X (a product of Sun Oil Company)

A predominantly naphthenic type hydrocarbon oil containing some aromatics having a light green color, a specific gravity of 0.94, a Saybolt viscosity of about 200 seconds at 100° F. and 85 seconds at 210° F., a pour point of 10° F., a flash point of 420° F., an aniline point of 181° F. and a boiling range of above 665° F.

Califlux OP (a product of Golden Bear Oil Company)

A blend of unsaturated components of naphthenic base petroleum having a specific gravity of 1.01, a Saybolt viscosity of 110 seconds at 210° F., a pour point of 45° F., a mixed aniline point of 34° C. and a boiling range of above 665° F.

Sovaloid N (a product of Socony)

A dark brown mineral oil containing about 80% aromatic and some naphthenic hydrocarbons having a SSU viscosity of 44 at 210° F., a specific gravity of 1.03, a pour point of below 0° F., a flash point of 350° F., a mixed aniline point of 115 and a boiling range above 600° F.

Sovaloid C (a product of Socony)

A synthetically derived entirely aromatic hydrocarbon petroleum oil having a specific gravity of 1.00, a SSU viscosity of 36 at 100° F., a pour point of 10° F., a flash point of 330° F., an aniline (mixed) point of 66 and a boiling range of above 580° F.

Cardolite 625 (Irvington Paint and Varnish Co. product)

A type of lower alkyl ether of an alkylated phenol where the lower alkyl is ethyl and the alkyl group on phenol is derived from cashew nut oil (about $C_{15}H_{27-31}$) with some (0.8 double bonds per mole) unsaturation. Also Cardolite 7625 like Cardolite 625 but 2 double bonds per mole and Cardolite 6583 like Cardolite 625 but a benzyl ether.

Octyl-decyl phthalate
Dioctyl phthalate
Phenyl Oleate

Flexol 8N8 (a product of Carbon & Carbide Company)

A high-boiling liquid plasticizer having a specific gravity of 0.9262, a boiling point of 220° C. at 5 mm. Hg and a flash point of 420° F. reported to be 2-ethyl-hexanoic acid diester of N,N-bis-(2-hydroethyl)-2-ethyl hexanamide: $C_{28}H_{53}NO_5$.

QXS1S8–(products of Imperial Oil Company)

In general naphthenic distillates
–B: light (with flash point of 325 and aniline point of 162),
–D: refined light (with flash point 345 and aniline point of 172),
–E: refined heavy (with flash point 370 and aniline point of 207),
–F: highly refined light (with flash point 345 and aniline point of 207), and
–G: highly refined with (flash point 490 and aniline point of 270).

But QXS1S8–H is a processed cracked tar asphaltic plasticizer with flash point of 315.

Liquid Poly B.D. (a product of Phillips Petroleum Co.)

A low molecular weight polybutadiene

Oils of ASTM Standards Nos. 1 to 3

These oils have the respective flash points and aniline points respectively: 1–470° F. and 124° C., 2–475° F. and 93° C. and 3–350° F. and 70° C.

Circle Light Oil (a product of Sun Oil Company)

A petroleum fraction more volatile than Circosol 2X and contains more aromatic hydrocarbon having a pour point below 0° F., flash point of 325° F. and an aniline point of 157° F.

Neville Heavy Oil (a product of Neville Company)

A thermal decomposition product of coal or oil mainly aromatics having a mineral aniline point of 28.2° C.

Diamond Process Oil (a product of Standard Oil Company)

A largely paraffinic petroleum distillate of low pour point having a specific gravity of 0.833, a flash point of 360° F., a viscosity of 100 at 100° F. and 39 at 210° F., an aniline point of 1.79 and a pour point of 15 to 20° F.

*Resinex 14 (a product of Horwich Standard Chemicals)*

Polymerized aromatic resins from cracked petroleum oils. Commarone-indene.

In the description of this invention, both in the specification and claims, the term "asphaltenes" is used consistent with ASTM D8–55 definition to identify that portion of asphaltic material: bitumen in petroleums, petroleum products, maltas, asphalt cements and solid native bitumens, which are soluble in $CS_2$ but insoluble in paraffin naphthas, that is insoluble in pentane but form a solution of colloidal suspension in such solvents as benzene, carbon disulfide or chloroform. It is desirable that the asphaltenes contain not more than 15% and preferably less than 5% pentane-soluble materials (ASTM D2006–62T) by weight such as the aforementioned resins and oils.

The process of this invention as applied to introducing asphaltenes substantially uniformly dispersed in a polyolefin polymer such as cis-polyisoprene or cis-polybutadiene or butadiene-styrene copolymer by solution technique can be carried out in the following manner. A solution of cis-polyisoprene or cis-polybutadiene or butadiene-styrene copolymer containing from 1 to 50, preferably 15 to 30, parts of polymer per 100 parts of solvent by weight is intimately mixed, preferably vigorously mixed as in a ball mill, high speed homogenizing mill or blender or with high speed stirring having a high shear action as well as providing turbulent flow with a solution or colloidal suspension of asphaltenes in an amount to provide 10 to 100, preferably 25 to 50 parts of asphaltenes per 100 parts of polymer by weight. The concentrations of asphaltenes in the solution or colloidal dispersion can be in the range of 1 to 50%, preferably 15 to 25% by weight. Suitable solvents for cis-polybutadiene or cis-polyisoprene are pentane, hexane, benzene, toluene, chloroform, and the like. Suitable solvents or liquids for colloidal suspension of asphaltenes are chloroform, carbon disulfide, pyridine, aniline, quinoline, carbon tetrachloride, trichlorethylene, dichlorethylene, benzene, toluene, and xylenes and the plasticizer or extender oils hereinbefore described. The size of particles of asphaltenes in solution are, of course, quite small and are in the nature of discrete molecules. However, when dispersed in rubber continuous phase, the asphaltenes particles should be 5 microns in diameter or smaller, desirably in the range of 0.01 to 5 microns, and preferably in the range of 0.01 to 1.0 micron. It is the high shear mixing that provides the small asphaltene particle size ultimately dispersed in rubber.

Certain of the vulcanization ingredients such as vulcanization accelerators and activators, anti-oxidants, softeners, vulcanizing agents, etc., can also be added to the solutions of the asphaltenes to be dispersed in the elastomer. Or such ingredients can be added after the solvent or solvents or dispersing liquids are removed to recover the asphaltene dispersed in the elastomer. Various means for recovering the elastomer-asphaltenes solid from solution can be employed such as by solvent evaporation or by vacuum extrusion, freeze drying or any other means by which the cis-polybutadiene or cis-polyisoprene are recovered from the solvents in which said polymers are formed. When vulcanization, softening, filling pigmenting, extending, anti-oxidant or anti-ozone, etc., ingredients are added while the dispersed asphaltenes in elastomer are still in solution, the solid mixture recovered from solution can be given a finish mill mixing on a roll mill or in a Banbury mill to insure uniform mixing of vulcanizing, etc., ingredients. The finished vulcanizable solid mixture can be formed, e.g. by extrusion, molding, etc., or calendered on cloth, paper, etc., and vulcanized at conventional conditions of temperature, pressure and time. The asphaltenes-elastomer solution containing the vulcanizing ingredients, pigments, fillers, extenders, etc., need not have all the solvent removed before using the vulcanizable composition. Rather the solution can be concentrated to a cement and used as such, e.g. spread on cloth or paper, in conventional manner of using vulcanizable cements. Also, friction stocks can be prepared from the asphaltenes dispersed in the cis-polybutadiene or cis-polyisoprene or butadiene-styrene copolymer.

As hereinbefore stated, asphaltenes incorporated in rubbery elastomeric materials by conventional rubber compounding milling techniques do not manifest either reinforcing or filling properties. A commercial styrene-butadiene rubber made by cold commercial polymerization was dry mixed on a conventional 2-roll rubber mill with alphaltenes. The asphaltenes was derived from 60–70 penetration paving asphalts by hexane extraction. This asphaltenes had 0.0 percent oils, 5.9 percent resins and 94.1 percent asphaltenes by weight. Other compounding ingredients to prepare a vulcanizable composition were also added. For comparison a similar composition but containing MT black was used in place of the asphaltenes. The resulting compositions were vulcanized for 23 minutes at 300° F. The amount of ingredients employed on a weight basis are shown below.

| Ingredients | Composition 1 | Composition 2 |
|---|---|---|
| Butadiene-styrene copolymer | 100.0 | 100.0 |
| Zinc oxide | 3.0 | 3.0 |
| Stearic Acid | 2.0 | 2.0 |
| Anti-oxidant | 1.0 | 1.0 |
| MT black | 50.0 | |
| Asphaltenes | | 50.0 |
| Sulfur | 2.0 | 2.0 |
| Vulcanization accelerator | 1.0 | 1.0 |

The vulcanizate of Composition 1 had a 300 percent modulus (p.s.i.) of 575 and ultimate tensile strength of 2150 p.s.i. and an ultimate elongation of 680 percent. The vulcanizate of Composition 2 had a 300 percent modulus of 275 p.s.i., an ultimate tensile strength of 1175 p.s.i. and an ultimate elongation of 110 percent. In contrast, the same asphaltenes are added by the technique of this invention by blending 133 grams of 15 percent solution of the same butane-styrene copolymer dissolved in benzene with a benzene solution of the asphaltenes so that the total solids in grams were 6 percent by weight and the resulting mixture was subjected to high shear mixing in a Waring Blendor for about 10 minutes. The solids were precipitated from the solution by adding the solution to methyl alcohol. The precipitated dispersion of asphaltenes in rubber is dried in a vacuum oven at 70° C. Then the dispersion of asphaltenes in rubber was used to make a vulcanizable composition following the same recipe of ingredients given for Composition 2. This composition was vulcanized at 300° F. for 23 minutes. The resulting vulcanizate has a 300 percent modulus of 375 p.s.i., an ultimate tensile strength of 2850 p.s.i. and an ultimate elongation of 800 percent.

To further illustrate the apparent uselessness of asphaltenes in rubbery elastomers, the following compositions were prepared by conventional mill mixing, formed in a sheet, the sheet heated at 290° F., under 500 p.s.i.g. pressure for 20 minutes.

| Ingredients | Composition A, parts | Composition B, parts |
|---|---|---|
| Cis-polyisoprene | 100 | 100 |
| Asphaltenes | 0 | 50 |
| Stearic Acid | 1.0 | 1.0 |
| Zinc oxide | 5.0 | 5.0 |
| Anti-oxidant | 1.0 | 1.0 |
| Sulfur | 3.0 | 3.0 |
| Benzothiazyl disulfide | 1.0 | 1.0 |
| Tetramethyl thiuram disulfide | 0.1 | 0.1 |

Samples of the sheets of vulcanized Composition A and Composition B were subjected to testing to determine tensile strength in pounds per square inch (p.s.i.) at 300% elongation (300% modulus), ultimate tensile strength in p.s.i. and percent ultimate elongation. These values are as follows:

|  | Composition A | Composition B |
|---|---|---|
| 300% Modulus, p.s.i. | 230 | 110 |
| Ultimate Tensile, p.s.i. | 2,690 | 710 |
| Percent Ultimate Elongation | 850 | 1,010 |

The foregoing data clearly indicate that asphaltenes do not have reinforcing properties or that asphaltenes are not suitable fillers. However, when asphaltenes are dispersed in rubbery elastomeric materials according to the process of this invention, the ability of asphaltenes appears to be altogether different as the following examples will illustrate.

EXAMPLES I AND II

Asphaltenes dispersed in cis-polyisoprene is prepared by mixing a solution of cis-polyisoprene in benzene containing 10 parts cis-polyisoprene per 300 parts of solution by weight with a solution of asphaltenes in benzene containing 5 parts of asphaltenes per 140 parts of solution by weight. The combined solutions are vigorously stirred while adding the ingredients hereinafter set forth in table form. The benzene is then removed by freeze drying to recover the solid vulcanizable composition. The recovered solid mixture is given a finish mill mixing, sheeted and heated at 290° F. for 20 minutes at 500 p.s.i. pressure. Samples of each sheet are subjected to physical testing to determine ultimate tensile strength and elongation and to measure 300% modulus. The vulcanizable compositions contained on the basis of 100 parts cis-polyisoprene by weight:

| Ingredient | Example I, parts | Example II, parts |
|---|---|---|
| Cis-polyisoprene | 100 | 100 |
| Asphaltenes | 50 | 50 |
| Stearic Acid | 2.0 | 1.0 |
| Zinc Oxide | 5.0 | 5.0 |
| Anti-oxidant (N,N-di-beta-naphthyl-p-phenylene diamine) | 1.0 | 1.0 |
| Sulfur | 3.0 | 3.0 |
| N-tert-butyl-2-benzothiazyl sulfenamide | 2.0 | 0 |
| Benzothiazyl disulfide | 0 | 1.0 |
| Tetramethyl thiuram desulfide | 0 | 1.0 |
| Glycerol | 0 | 1.0 |

The vulcanizates of Examples I and II are found to have the following properties:

|  | Example I | Example II |
|---|---|---|
| 300% Modulus, p.s.i. | 825 | 1,180 |
| Ultimate Elongation, percent | 620 | 420 |
| Ultimate Tensile Strength, p.s.i. | 2,650 | 1,650 |

When the above data are compared with the physical data for Compositions A and B hereinbefore given, it will be readily seen that asphaltenes incorporated in rubbery elastomers according to this invention display a significant reinforcing effect. When vulcanizable compositions are prepared as above, but without asphaltenes, the 300% modulus of the resulting vulcanizates is about 300 p.s.i. Hence, the use of asphaltenes increase the 300% modulus significantly without decreasing ultimate tensile strength or elongation to impractical levels.

As an indication of the particle size of asphaltenes dispersed in vulcanizable rubbery elastomeric materials and the degree of dispersion in the rubbery material the following mixing techniques are carried out. Benzene solutions of asphaltenes contain no visible particles at 430× or 970× magnification. When a 10% solution of asphaltenes in benzene is mixed at room temperature with a 3⅓% solution of polyisoprene in benzene, many asphaltenes particles 5 to 10 microns in diameter in the polymer are visible and some were 50 to 100 microns in diameter. After refluxing for about 2 hours, the 50 to 100 micron globs disappeared but the majority of visible ones are about 5 microns in diameter. Addition of mahogany soap followed by refluxing overnight and stirring by a magnetic stirrer, does not reduce the size of asphaltenes. Vigorous mixing in a "Waring Blendor" seems to shred the asphaltene globs so that no particles in rubber as large as 5 microns are left. The vulcanizate formed from the dispersion of asphaltenes in the rubber wherein the particles are about 5 to 10 microns with some of 50 to 100 microns in diameter showed little reinforcing by the asphaltenes. Although the vulcanizate of the asphaltenes-containing polyisoprene wherein the particles of asphaltenes in the rubber are all about 5 microns in diameter shows somewhat better reinforcement, the vulcanizate obtained wherein the particles of asphaltenes in the rubber were all smaller than 5 microns (i.e. 0.01 to 1.0 micron) in diameter shows outstanding reinforcement by asphaltenes.

When a rubber mixture such as Composition 2 hereinbefore described is made using conventional mill making technique, inspection of a fresh cut edge of the sheeted material with a low power magnifying glass will show brown specks of asphaltenes and the cut edge will not show the shine that is characteristic of well dispersed reinforcing material.

To ascertain whether incorporating vulcanization and compounding ingredients by the solution technique had any adverse effect on the properties of the resulting vulcanizate, the following compositions were prepared and comparisons made with a vulcanizate prepared by the process of this invention and with carbon black reinforced (high abrasion furnace black-HAF). The amounts of ingredients are parts by weight.

| Ingredients | Gum stock Mill Mix | Gum stock Solution Mix | Carbon Black Reinforced Mill Mix | Example III Solution Mix |
|---|---|---|---|---|
| Cis-polyisoprene | 100 | 100 | 100 | 100 |
| Stearic Acid | 1.0 | 1.0 | 1.0 | 1.0 |
| Zinc Oxide | 5.0 | 5.0 | 5.0 | 5.0 |
| N,N'-di-(beta-naphthyl)p-phenylene diamine | 1.0 | 1.0 | 1.0 | 1.0 |
| Sulfur | 3.0 | 3.0 | 3.0 | 3.0 |
| Benzothiazyl disulfide | 1.0 | 1.0 | 1.0 | 1.0 |
| Tetramethyl thiuram disulfide | 0.1 | 0.1 | 0.1 | 0.1 |
| High abrasion furnace black | | | 50 | |
| Asphaltenes | | | | 50 |

Mill mixing is carried out on a conventional roll mill. Solution mixing is carried out by ball milling the ingredients in benzene in an amount of 3000 parts per 100 parts of cis-polyisoprene. The resulting viscous liquid is freeze dried to remove benzene and the resulting solids are held at 50° C. in a vacuum oven for about 12 hours. Both the vulcanizable solids obtained by mill mixing and the solids obtained by solution mixing and drying to remove benzene are sheeted and then vulcanized at 290° F. for 20 minutes at 500 p.s.i. The resulting vulcanizates are submitted for physical testing for 300% modulus, ultimate tensile and ultimate elongation which are shown below:

|  | Gum stock | | Carbon Black Reinforced | Example III |
|---|---|---|---|---|
|  | Mill Mix | Solution Mix | | |
| 300% Modulus | 260 | 230 | 2,320 | 795 |
| Ultimate Elongation, percent | 845 | 850 | 300+ | 420 |
| Ultimate Tensile, p.s.i. | 2,660 | 2,690 | 2,460 | 2,260 |

From the substantially identical properties of the Gum Stock vulcanizate, both mill mixed and solution mixed, it is apparent that solution mixing does not have an adverse effect on the vulcanizate. By comparing the properties of the carbon black reinforced vulcanizate with those of the asphaltene reinforced vulcanizate of Example III, it is apparent that the vulcanizate of Example III retains a substantial amount of elasticity while having an ultimate tensile strength of an acceptable, useful value.

The resinous and oil material associated with precipitated and even washed asphaltenes, as their content increases, have a tendency toward reducing the reinforcing effect of asphaltenes and hence, result in a vulcanizate of reduced ultimate tensile over that produced by the use of asphaltenes of relatively low resin and/or oil content. Also, the manner in which the asphaltenes are incorporated in the vulcanizable rubbery elastomeric material has a pronounced effect on the ability of asphaltenes to reinforce the vulcanizate. To demonstrate these effects there are prepared vulcanizable compositions containing cis-polyisoprene wherein asphaltenes of varying oil and resin content (the asphaltene content is shown in parenthesis) are employed and are incorporated by subjecting the solution of cis-polyisoprene and asphaltene in benzene to vigorous agitation and turbulent mixing (as produced by a homogenizing mill or blendor) whereby a substantially uniform homogeneous intimate mixture of rubbery elastomeric material and asphaltenes are formed. These vulcanizable compositions contained on a parts-by-weight basis for each 100 parts of cis-polyisoprene:

| Ingredient | Example IV | Example V | Example VI |
|---|---|---|---|
| Cis-polyisoprene | 100 | 100 | 100 |
| Asphaltenes (94%) | 50 | | |
| Asphaltenes (83%) | | 50 | |
| Asphaltenes (90-92%) | | | 50 |
| Sulfur | 2.0 | 2.0 | 2.0 |
| N-tert-butyl-2-benzothiazyl sulfonamide | 2.0 | 2.0 | 2.0 |
| Stearic Acid | 2.0 | 2.0 | 2.0 |
| Zinc Oxide | 5.0 | 5.0 | 5.0 |
| N,N'-di-beta-naphthyl-p-phenylene diamine | 1.0 | 1.0 | 1.0 |

The foregoing compositions are given a finish roll mill mixing, sheeted, and heated at 290° F. for 25 minutes at 500 p.s.i. Samples of each vulcanized sheet are subjected to physical testing to determine 300% modulus, ultimate elongation and ultimate tensile strength. These values are as follows:

|  | Example IV | Example V | Example VI |
|---|---|---|---|
| 300 Modulus, p.s.i. | 1,220 | 980 | 973 |
| Ultimate Elongation, percent | 590 | 550 | 618 |
| Ultimate Tensile Strength | 3,430 | 2,120 | 2,919 |

Comparison of the above data with that of Example II indicates that ball mill mixing of the solution (Example III) is not as efficient as the more vigorous solution mixing (Example IV) for incorporating asphaltenes to form a substantially uniform intimate mixture in the rubbery elastomeric but ball milling solution mixing is superior to conventional roll mill or other dry mixing of asphaltenes and rubbery elastomer (Composition B).

Asphaltenes used in butadiene-styrene copolymer produced at 41° F., i.e., cold rubber such as type 1500, have an equivalent loading property to medium processing channel blacks and impart properties vastly superior to ordinary fillers.

The asphaltene reinforced vulcanizable rubbery elastomeric materials need not be sulfur vulcanized but can also be peroxide vulcanized. Asphaltenes reinforcement of vulcanizable rubbery elastomeric materials can be supplemented with high reinforcing carbon blacks, high abrasion carbon blacks, as well as carbon blacks which impart better processing; e.g., extrusion properties.

Another method for using the technique of this invention is carried out by having the asphaltenes present during the bulk polymerization of butadiene or isoprene. Where the polymerization of butadiene or isoprene is to be carried out to the extent to form a hard or tough polymer having a Mooney plasticity value of above 100, the asphaltenes is dissolved in an extender or plasticizer oil and then the resulting solution of asphaltenes in the plasticizer oil together with monomer and catalyst are charged to a polymerization chamber maintained under polymerization conditions for such a polymerization. The Ziegler type catalyst can be employed among other catalysts for the polymerization of butadiene or isoprene. Such polymerization in the presence of asphaltenes dissolved in plasticizer oil can be carried out to provide on the basis of 100 parts polymer by weight from 10 to 100 parts by weight of asphaltenes and the required amount of plasticizer oil to give a resulting polymer composition having a compounded Mooney plasticizer value in the range of 40 to 80. By such a process a polymer is produced which can be conveniently processed on conventional rubber plant apparatus to prepare vulcanizate of the oil-extended type to which additional reinforcement or abrasion resistant carbon black may be added according to the needs of the resulting vulcanizate as hereinbefore demonstrated. Little or no reinforcing black or abrasion black need be added when the asphaltenes is properly dispersed in the rubbery polymer of the critical particle diameter size, for asphaltenes can be a complete substitute for at least the reinforcing blacks.

Another example of obtaining the necessary dispersion of asphaltenes in rubbery polymer according to this invention is carried out by dissolving 10 to 25 parts per weight of asphaltenes in benzene or toluene and combining this with isoprene (about 10 to 30 parts) and the mixture cooled to a temperature of 50° C. Thereafter a Ziegler type catalyst for example triethyl aluminum and titanium tetrachloride is added. After polymerization is carried out to obtain a polymer having a Mooney plasticity value of about 80 a catalyst deactivator can be added if desired and an anti-oxidant is added. The solvent can be removed by vacuum extrusion or removed by other means such as for example by drying. The resulting dispersion of asphaltenes in the polymer can then be compounded to a vulcanizable composition in the conventional manner.

Still another means for obtaining the advantages of the utilization of asphaltenes according to this invention is carried out by combining 100 parts of asphaltenes and 25 to 100 parts of an aromatic extender oil the plasticizer for tough synthetic rubber. The mixture is stirred and if desired heated so that no discrete particles of asphaltenes are visible when the mixture is viewed under a light microscope. Mixing to accomplish the foregoing can be carried out in a colloid mill or similar high shear mixing device. In place of high shear mixing a small amount of benzene toluene or other volatile solvent can be added to the mixture of asphaltenes or aromatic plasticizer oil. After obtaining the mixture having no discrete particles of asphaltenes, the benzene, toluene or other volatile solvent is removed for example by evaporation. The aromatic plasticizer oil containing the asphaltenes is then combined with the high Mooney plasticizer value rubbery polymers, that is, those polymers having a Mooney value of above 100.

A further means for obtaining the advantages of using asphaltenes according to this invention involves forming an intimate mixture or solution of asphaltenes in a rubber plasticizer oil such as an aromatic extender oil, with or without the addition to a volatile solvent such as benzene. The resulting mixture is then dispersed in water using a suitable anionic or ionic dispersing agent. The resulting dispersion is then mixed with a synthetic rubber latex for example in a colloid mill. Thereafter the combined aqueous dispersions is treated with a coagulant, such as salt-acid coagultant to precipitate the synthetic rubber with the asphaltenes substantially uniformly dispersed therein as particles having the critical diameter hereinbefore disclosed. More specifically, for example, 100 parts by weight of asphaltenes are slurried with 25 to 100 parts of a plasticizer-extender oil such as the Dutrex 7 hereinbefore described. Benzene, toluene, chloroform, or other volatile solvent can be added so that the resulting solution is sufficiently fluidized to be dispersed in water. This aqueous dispersion can be added to a latex containing styrene-butadiene rubber such as the ASTM designated SBR 2103 having contained polymer of a Mooney plasticity value of 150 to provide for each 100 parts of rubber 100 parts by weight of asphaltenes and as much plasticizer oil as desired to give a compounded Mooney of 40 to 80 for the recovered rubber. The mixture of the dispersion and latex are passed through a colloid mill and then coagulate to recover the rubbery polymer. This provides an oil extended rubbery polymer of processing characteristics suitable for plant apparatus, and the same time provides, because of the high asphaltenes content, the equivalent of a reinforcing master batch.

As a modification of one of the foregoing means of obtaining the benefits of this invention the asphaltenes are dissolved in styrene or a mixture of styrene and benzene and then charged to either the hot or cold emulsion polymerization process for preparing butadiene-styrene synthetic rubber. If the asphaltenes are not dispersed in the particle size as hereinbefore disclosed the latex from this polymerization can be passed through a colloid mill completing the dispersion of asphaltenes particles in the rubbery polymer. The determination of the dispersion of particles of asphaltenes of proper size can be readily made by taking a sample of the latex from the polymerization process subjecting the latex to coagulation or dry the sample of latex under the conditions conventionally employed to determine the latex solids content. Thereafter the dried polymer is examined under a high power microscope and the size of the particles of the asphaltenes dispersed in the rubbery polymer is measured.

The advantages of this invention can also be obtained by dispersing particles of asphaltenes in butadiene-acrylonitrile rubber, polychloroprene rubber and butyl rubbers.

For the purposes of this invention it is not necessary nor desirable to go into detail with respect to the preparation of synthetic rubbers of both low and high Mooney values. The preparation of such rubbery polymers is well known to those skilled in the polymerization art. Briefly, either the high or low Mooney value synthetic rubbers can be prepared by emulsion and mass free radical polymerization processes and also by the ionic polymerization process including both the Alfin catalyst process and the Friedel-Crafts catalyst process. Synthetic rubber is prepared by the cold process and generally prepared by emulsion polymerization using a redox type catalyst system at polymerization temperatures of below 60° F. The high Mooney plasticity of synthetic rubbers are generally obtained at conversions above about 62 percent except in the case where specific modification at higher conversions results in lower Mooney value polymers. The cold rubber can be prepared at about the same conversions and result in either high or low Mooney value polymers depending of course upon polymerization modification. The Alfin catalysts are a complex of the sodium compounds of alcohol and olefins. The Ziegler type catalyst is a combination of a compound of a transition metal of Groups IV, V, VI, VIII (generally an oxychloride or chloride), preferably titanium tetrachloride, with a compound of a reducing metal generally an aluminum compound, preferably an aluminum trichloride.

What is claimed is:

1. The process of dispersing asphaltenes in a latex of synthetic diene rubber which comprises adding an aqueous dispersion of a hydrocarbon solution of asphaltenes to a latex of synthetic diene rubber, subjecting the mixture to high shear mixing and coagulating the asphaltenes-containing rubber wherein said process the weight ratio of asphaltenes to said rubber in the latex is in the range of 10 to 100 per parts of rubber and the particle size of asphaltenes dispersed in the coagulated rubber is of a diameter not exceeding 5 microns.

2. The method of obtaining dispersed asphaltenes in synthetic diene rubber which comprises polymerizing a mixture having a conjugated diene in the presence of dissolved asphaltenes in a polymerization chamber, removing the resulting polymerization product and recovering therefrom as the product the asphaltenes dispersed in the resulting synthetic diene rubber.

References Cited

UNITED STATES PATENTS

| 2,009,712 | 7/1935 | Frolich | 106—23 |
| 3,048,559 | 7/1962 | Heller et al. | 260—33.6 |
| 3,081,276 | 3/1963 | Snyder et al. | 260—33.6 |
| 3,202,623 | 8/1965 | Endres et al. | 260—28.5 |

OTHER REFERENCES

Rostler et al.: "Compounding Rubber with Petroleum Products," Industrial and Engineering Chemistry, March 1949, vol. 41, pp. 598–608.

Materials and Compounding Ingredients for Rubber and Plastics, India Rubber World, 2d ed. TS 153 1947 COP 2.

MORRIS LIEBMAN, *Primary Examiner.*

J. A. GAZEWOOD, H. S. KAPLAN, *Assistant Examiners.*